United States Patent [19]

Schröder

[11] Patent Number: 5,767,679
[45] Date of Patent: Jun. 16, 1998

[54] GEOPHYSICAL PROSPECTING APPARATUS UTILIZING PULSED ELECTROMAGNETIC SIGNALS AND HAVING A SCANNED FOUR-CYCLE TRANSMITTER

[76] Inventor: Diether-Alfred Schröder, Schöntalweg 62, D 53347 Alfter, Germany

[21] Appl. No.: 726,418

[22] Filed: Oct. 7, 1996

[51] Int. Cl.[6] .................. G01V 3/12; G01V 3/17; G01S 13/02; H01Q 3/24
[52] U.S. Cl. .............. 324/337; 324/329; 342/22; 342/181; 342/371; 342/459; 343/711; 343/876
[58] Field of Search ............... 324/329, 334, 324/337; 342/22, 27, 82, 88, 181, 371, 372, 459; 343/711, 713, 715, 876

[56] References Cited

U.S. PATENT DOCUMENTS

| | | | |
|---|---|---|---|
| 3,546,698 | 12/1970 | Kaltschmidt . | |
| 3,665,466 | 5/1972 | Hibbard | 324/337 X |
| 3,721,989 | 3/1973 | Christensen . | |
| 3,836,960 | 9/1974 | Gehman et al. | 324/337 X |
| 4,008,469 | 2/1977 | Chapman | 324/337 X |
| 4,100,481 | 7/1978 | Gournay | 324/337 |
| 4,245,191 | 1/1981 | Schroeder | 324/337 |
| 4,937,580 | 6/1990 | Wills | 342/22 |
| 5,130,711 | 7/1992 | Kimura et al. | 342/22 |
| 5,192,952 | 3/1993 | Johler | 342/22 |

FOREIGN PATENT DOCUMENTS

| | | |
|---|---|---|
| As 1019356 | 11/1957 | Germany . |
| 1766662 | 8/1971 | Germany . |
| 2626532 | 12/1976 | Germany . |
| 2550715 | 5/1977 | Germany . |
| 2554039 | 6/1977 | Germany . |
| 3114167 | 10/1982 | Germany . |
| 219694 | 2/1942 | Switzerland . |
| 1137252 | 12/1968 | United Kingdom . |
| 2238439 | 5/1991 | United Kingdom . |

OTHER PUBLICATIONS

Radar finde verschollene Mauern. (1988) In: Bild der Wissenschaft 1/88, s.65, 66, 70.

Telegon IV Sichtpeilanlage PST 638/3 der Fa. Telefunken KB/016/2, S.2–11; S.5, Bild 4 i.v.m. Text (1921).

Primary Examiner—Gerard R. Strecker
Attorney, Agent, or Firm—Klauber & Jackson

[57] ABSTRACT

Apparatus for use in a geophysical prospecting method from a vehicle for site plan pictorial representation of inclusions present in substratum soil which reflect modulated electromagnetic oscillations. This apparatus is particularly useful for detecting inclusions such as veins of water, ore beds, pipelines, unexploded bombs, cavities, ammunition and residual fissures. A transmitter and receiver are mounted in the vehicle with a common quartz oscillator in a sawtooth generator. A transmitting antenna and receiving antenna are provided with an amplifier connected to the latter. A pulse shaper employs the width of received triangular pulses from the amplifier to give needle pulses and a color transmitter has four power amplifiers and is a goniometrically scanned four-cycle transmitter, and accordingly the cathode ray tube has four crosswise arranged horizontal sweep coils in addition to the frame coil. The frequency of the frame sweep and scanning signals is 50 Hz and these signals are stabilized using a synchronizing signal obtained from the quartz crystal/oscillator circuit. The crystal frequency typically is 50 kH and the synchronization signals are obtained by a frequency divider network having a ratio of 1000:1.

16 Claims, 5 Drawing Sheets

GEOPHYSICAL PROSPECTING APPARATUS UTILIZING PULSED ELECTROMAGNETIC SIGNALS AND HAVING A SCANNED FOUR-CYCLE TRANSMITTER

FIELD OF INVENTION

The invention relates to a method and apparatus (particularly an electrical circuit), for use in geophysical prospecting for site plan pictorial representation of the substratum from a vehicle.

BACKGROUND TO THE INVENTION

Circuits for geophysical prospecting and for investigating the structural characteristics of upper soil layers, eg for establishing the existence of water, oil, ore deposits or occlusions of gas, are known. With most of the known circuit layouts, which are constructed according to different radar principles, modulated electromagnetic waves are transmitted into the soil layers to be investigated and apparatus is provided to measure the time interval between the time of transmission and the time of the return reflected signals. Such apparatus can combine the transmitter and receiver (DE-AS 1 102 306). However, with known circuits the electromagnetic wave is emitted in the form of single pulses or in the form of pulse or frequency-modulated high frequency waves, typically in the SW or VHF range. Experience has shown that such high frequencies do not penetrate many soil types.

In other methods electromagnetic waves having a relatively low frequency of about 80 to 550 kHz are transmitted into the soil, and this low carrier frequency is modulated with other frequencies (French Patent 993 657).

The literature describes the use of reflection methods, particularly when investigating salt deposits. Reference is made to the article entitled "Prospects for the reflection method in radio prospecting", "Gluckauf", 1943, pp 336–340.

It is also known to introduce into the soil long wave electromagnetic waves and perform capacitive, inductive and resistive measurements (Geophysical Prospecting, vol 23, No. 1, March 1975, pp 104 to 124). This is because long wave-band (ie low frequency signals) have been found more easily to penetrate most soils.

In radar technology it is standard practice to visually display on a cathode ray tube the transmitted and the reflected signals, the latter being displayed following demodulation in the receiver, and to carry out the time sweep of the tube at the modulation frequency. Due to the special conditions of the limited propagation of electromagnetic waves in the substratum it has been found that in the case of signals around 100 kHz the range of transmitted and received sinusoidal pulse approximately corresponds to the range of the time sweep with a triangular wave of the same frequency. Thus, in this low frequency substratum radar method, modulation of the carrier is superfluous and could be obviated. If the sine wave of the transmitter and the triangular wave of the time sweep are synchronised, as by a common quartz oscillator, clearly defined measurements on an appropriate scale are possible. By obviating modulation it is necessary to install a pulse shaping circuit in place of conventional demodulation circuits. In the receiver, a particularly simple pulse shaping circuit has been used in the case of geophysical prospecting from a vehicle (DE 2 550 715), in which the sine waves are shaped into short duration (needle) pulse with sharply rising and falling edges, which are clearly and unambiguously shown on the screen, i.e. with the correct transit time and without heterodyning and which can therefore be detected individually and separately from one another. In this known pulse shaping circuit the pulse shaper is connected as a pentode and its control grid is applied across a RF choke to a stabilised, negative bias and whose screen grid is directly connected to the operating voltage. The needle pulses are then taken from the anode. To this extent the pentode constitutes a variation of the previously conventional circuit technology, because its screen grid is directly applied to the full positive operating voltage and the control grid is connected across an RF choke to a negative bias. The pentode operates in the operating point "C" i.e. on a part of its characteristic such that if a sine wave is applied to the control grid the negatively directed half-wave fractions are completely cut off, and the pedestal sections of the positively directed half-wave fractions are cut off and the remaining crests are distorted to produce the pointed needle pulses due to the very high gain. As the cathode ray tube screen is turned by 90° for ease of viewing purposes, the represented needle pulses are horizontal and are displaced with respect to one another on a vertical time line and can be clearly differentiated. The distance between the needle spikes can be easily measured and used as a basis for calculations concerning the distance and therefore the depth or range of the reflected inclusions in the soil.

On the basis of this prior art, the object of the invention is to improve the known circuit.

SUMMARY OF THE INVENTION

A circuit as aforesaid allows the detection of inclusions present in the soil by transmitting and detecting reflected modulated electromagnetic signals therefrom.

The apparatus comprises a transmitting part having a quartz oscillator in a sawtooth generator and a transmitting antenna connected thereto, and a receiving part which includes a receiving antenna with an amplifier connected thereto followed by a pulse shaper which compresses the width of the received pulses to produce very short duration pulses (referred to herein as needle pulses) and a colour CRT display for displaying signals from the circuit, and in accordance with the invention the transmitter is a goniometrically scanned four-cycle transmitter.

The CRT may include four cross wire arranged horizontal sweep coils and a frame coil.

The transmitter may comprise four power amplifiers.

Synchronisation of the scanning signals may be derived by frequency division of the quartz crystal signals.

The transmitting antenna may comprise four ferrite elements, (rods or quarter-ring shaped members).

The invention may be used to detect veins of water, ore beds, pipelines, unexploded bombs, cavities, communication lines and residual fissures.

By way of example, an embodiment of the circuit layout according to the invention is described in greater detail hereinafter relative to the attached drawings, in which.

DETAILED DESCRIPTION OF THE DRAWINGS

Figure 1:
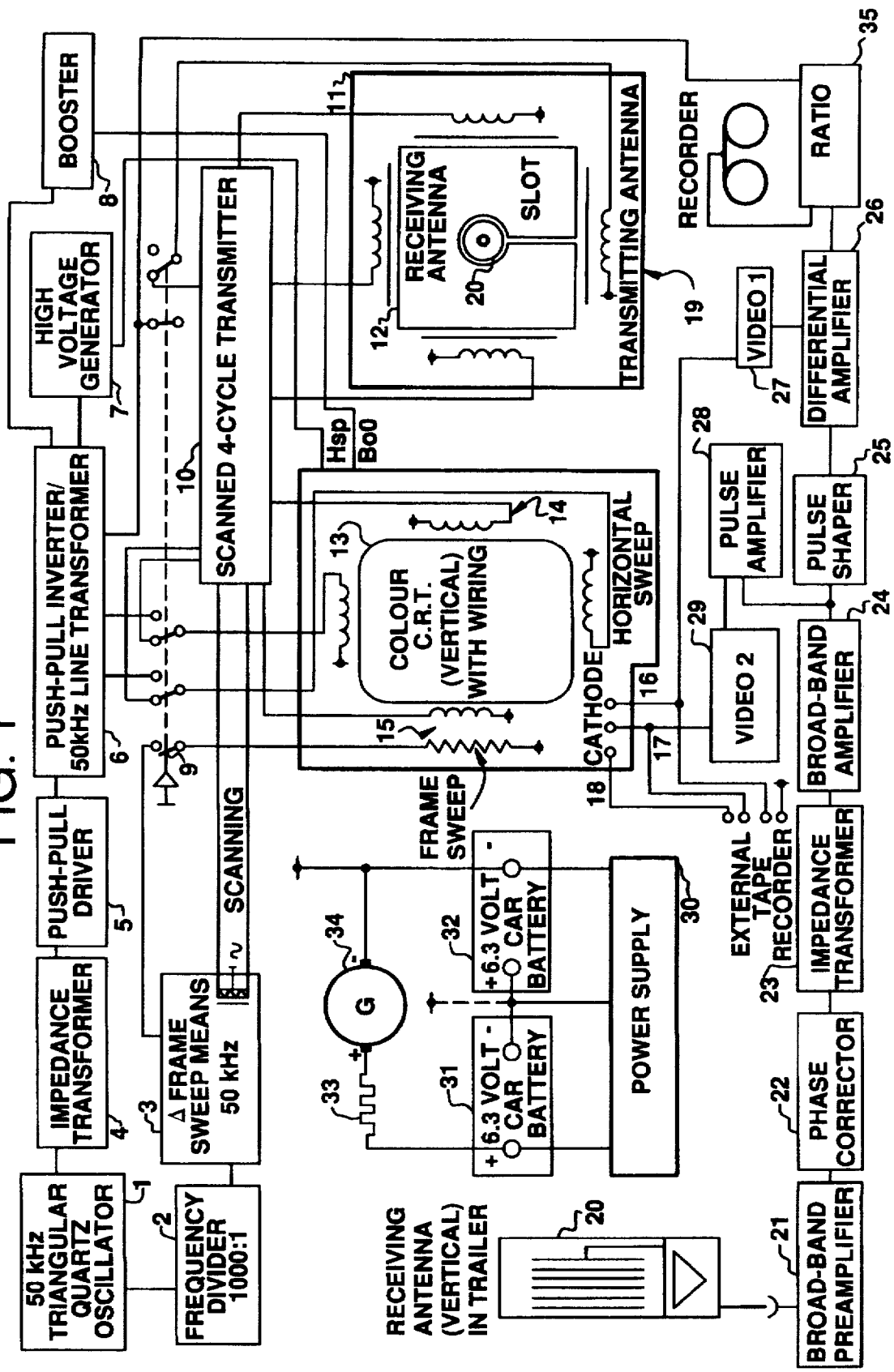
FIG. 1 is a block circuit diagram of the circuit layout.

The essence of the circuit layout is a 50 kHz quartz oscillator 1, which produces triangular oscillations. Its circuit is generally known (CD4011) and to it is connected a frequency divider 2 in the ratio 1000:1, which drops the frequency from 50 kHz to 50 Hz and controls to 50 Hz a conventional frame sweep means 3. To the quartz oscillator 1 is also connected an impedance transformer 4 in the form of a source follower with following line balance converter. The latter controls two push-pull drivers or a single push-pull driver 5, in each case comprising a low-power transistor, which in the source or emitter follower circuit are directly connected to the gates of the two MOS power transistors of the push-pull inverter 6, which with the common transformer simultaneously forms the 50 kHz final line stage. High voltage generator 7 for the picture tube is by means of a high voltage cascade from a winding of the line transformer. To the line transformer is also applied the booster 8 Comprising a rectifier, which here obtains from the line feedback pulse both the voltage supply of the picture tube 13 and the operating voltage of the single tube still present in the pulse shaper. The switch 9 switches the here vertically fitted picture tube 13 from the vertical perspective of the substrate to the horizontal perspective. In the vertical perspective the frame and horizontal sweep are operated conventionally as in a normal colour television, ie with one frame and two horizontal sweep coils, and the transmitting power is passed across the switch to the large ferrite transmitting antenna 19, although the frame sweep is not shown connected by switch 9 in FIG. 1. However, in the horizontal perspective the 50 Hz frame sweep 15 is disconnected. The horizontal sweep is then intermittently supplied via goniometrically scanned four cycle transmitter 10 (FIG. 2) to the four horizontal sweep coils so that there is a horizontal sweep rotating in radiant manner about the screen centre by 360° and in this case the four-cycle transmitter 10 and partly via the switch 9.

The triangular 50 kHz RF voltage for controlling the four-cycle transmitter 10 is supplied from the inverter 6 across the switch 9. The 50 Hz sinusoidal scanning voltage is obtained from a push-pull winding with centre tapped earth connection in the transformer of the frame sweep means 3. The transmitting power is intermittently or alternately slidingly scanned as in the case of the horizontal sweep from four output amplifiers PA1 ... A4 (FIG. 2) and then successively goniometrically passed to the four large ferrite transmitting antennas 19. They are fitted horizontally externally to a slotted sheet metal box 12, which is located on a car trailer in the interior of a square plastic box 11. The circuit layout is mainly located in the towing vehicle. As a result of the arrangement on the four sides of the sheet metal screening box 12 it is possible to avoid an undesired back radiation, as opposed to a reradiation.

The transmitting beam rotates synchronously and in the same way with the horizontal sweep by 360° around the car trailer. This replaced a rotating antenna. In the vertical representation only one transmitting antenna is connected across the switch 9. Instead of this, it would be possible there to operate an additional large ferrite transmitting antenna 19 with a highly vertical directional characteristic.

In a correspondingly large hole in the centre of the square boxes 11 and 12 is vertically fitted the active large ferrite receiving antenna 20 with a slotted, cylindrical screen. This multirod ferrite antenna can be switched from broad to narrow band reception via a relay for sensitivity setting. It also has a preamplifier and a cable amplifier. At the upper end of its mounting support it has a double fine drive, which, by means of two crossed thread spindle, makes the upper part displaceable with high precision in both horizontal axes. Due to its similarity with the compound slide rest of a small lathe, this device is called an antenna support. The function is to achieve a precise electromagnetic right angled nature of the vertically fitted, screened receiving antenna 20 with respect to the horizontally fitted transmitting antennas 19 and the self-consistent field of the car trailer body, in order to neutralise characteristic radiation. All antennas are connected via coaxial cables to the apparatus casing.

On the receiving antenna 20 the equipment inlet is followed by the regulatable, broad-band pre-amplifier 21, then the phase corrector 22, comprising a RC phase shifter with potentiometer and then an impedance transformer 23 in the form of a source following stage and finally a broad-band amplifier 24 with IC, whose output leads to the pulse shaper 25 and pulse amplifier 28. The pulse shaper 25 transforms a sine or triangular wave into a needle pulse marking on the screen the position of the objects as a single line.

For narrowing the needle pulse it is supplied to a differential amplifier 26, whose one output leads to the ratio detector 35. Normally the latter is a phase comparison circuit between the transmitting and receiving phase and to whose output is connected an external recorder or an instrument.

The other output of the differential amplifier 26 leads to the video 1, 27, which corresponds to a conventional colour television. An output leads to a cathode 16 of the colour tube 13. There is also a connection for an external tape recorder. The pulse amplifier 28 supplies the signal from the broad-band amplifier 24 in unshaped, but amplified form to the input of the video 2, 29, which is connected in the same way as the video 1, 27. Video 2, 29 is connected at the output to the other cathode 17 of the colour picture tube 13, as well as to a further tape recorder connection. Video 2 supplies a different color background to the structures surrounding the target objects.

Random marking signals can be fed into the third cathode 18 of the tube 13 and given a color different from the images of Video 1 and Video 2.

The power supply 30 is completely independent of the vehicle supply, so as to exclude overloading risks. The two car batteries 31, 32 are connected across a protective ballast resistor 33 to a second and in particular light dynamo 34 in the vehicle and are constantly recharged by the latter. Due to the filament voltages of the tubes used in the circuit layout of 6.3 V and due to the operating voltage of transistors of 5 V, use is made of two 6.3 V batteries instead of one 12 V battery. In addition, different PNP and NPN transistors and certain IC chips with different operating voltage can make it necessary to apply earth to the centre connection of the two batteries.

Figure 2:
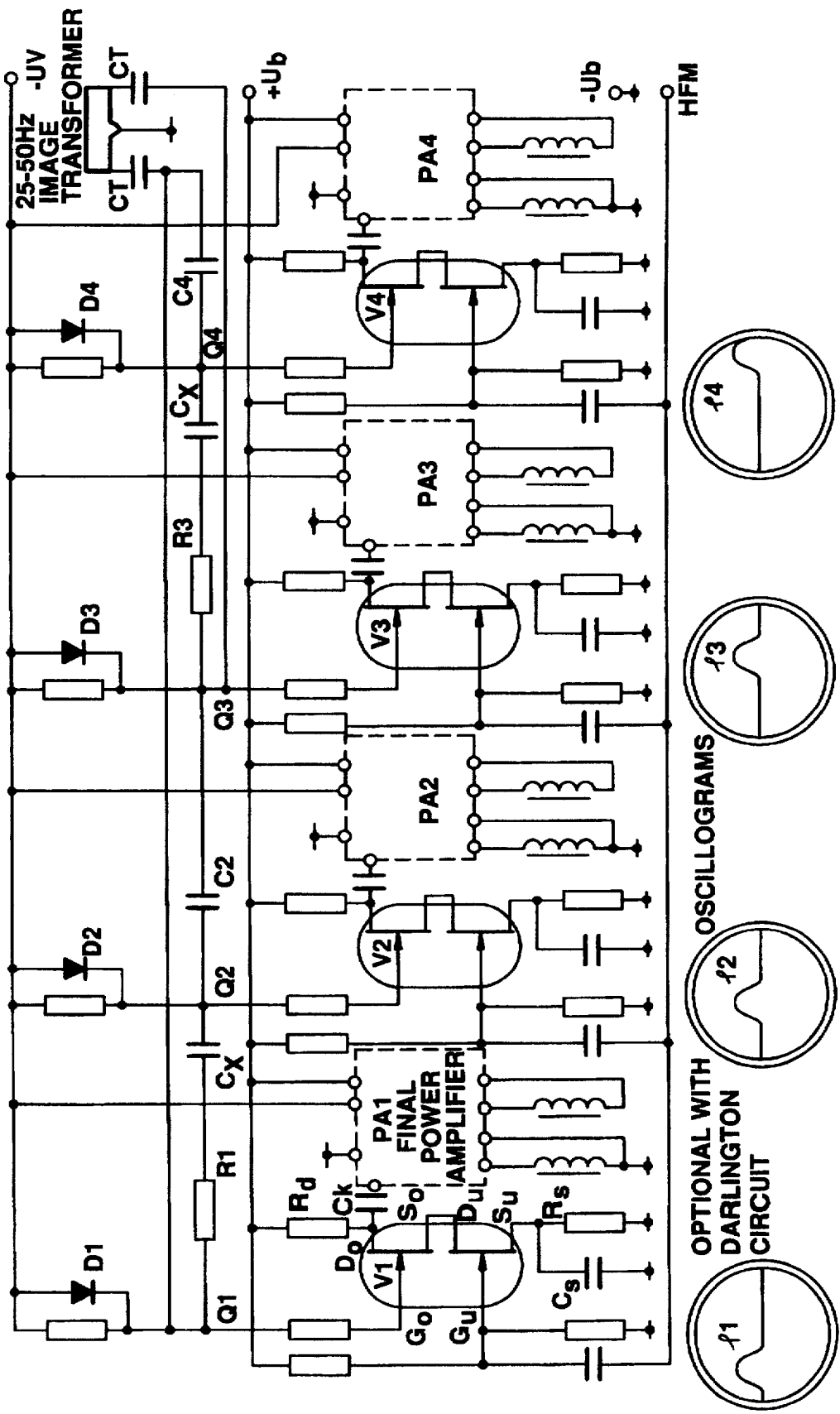
FIG. 2 is a block circuit diagram of the inventive, scanned four-cycle transmitter.

The scanned four-cycle transmitter, shown as block 10 in FIG. 1, is shown in FIG. 2 in detail. The input stage of the transmitter is a center-tapped secondary winding of the frame sweep transformer, which, in push-pull operation, in horizontal perspective, supplies a 25 to 50 Hz sine wave signal across the two isolating capacitors CT, to which is connected a phase shift chain (R1, C2, R3, and C4) at $\phi$1 and $\phi$3, wherein $\phi$1, $\phi$2, $\phi$3 and $\phi$4 are each phase shifted by 90° and connected across the clamp diodes D1, D2, D3, and D4, including parallel resistors to the reverse voltage −UV. As these diodes cut away the negative half-waves, the four oscillograms during a cycle $\phi$1, $\phi$2, $\phi$3 and $\phi$4 have only a positive half-wave of 180° total width and 90° phase spacing. When there is no positive half-wave pulse, and given the negative bias −UV, the upper gate Go of the thyratron FETs V1, V2, V3 and V4 (e.g. CD 4011) is blocked (operating point B).

When there is a positive half-wave pulse the upper gate Go opens at the level of the a.c. voltage. Applied parallel to the lower source Su are the resistor Rs and capacitor Cs, which keep the lower gate Gu at the operating point A. All the other gates are simultaneously permanently controlled with the triangular high frequency of 50 kHz. Thus, at the upper drains Do there are negative envelope curves with alternately sliding scanning. All the upper drains Do of the thyratrons are connected across capacitor Ck with the inputs of the respective following final power amplifiers PA1, PA2, PA3 and PA4. The latter are in chip form, but can have a random design, namely as high-power Darlington circuits, MOS source followers or the like.

It is important that both the horizontal sweep coils and the transmitting ferrite antennas have an adequate power supply.

In the case of Darlington circuits or source followers their coils have no parallel capacitors and are low-resistance. The bias −UV keeps the final power amplifiers PA1, PA2, PA3 and PA4 at the operating point B and consequently de-energises them in the scanning intervals.

In the case of the four ferrite transmitting antennas at right angles to one another in the car trailer, the alternately sliding scanning through the sliding power change leads to a constantly progressing, goniometrically rotating radiation direction. The metal of the screening box 12 and the deflectors fixed thereto prevent a back radiation and therefore ambiguities in the display on the screen. The two capacitors Cx in the phase shifting circuit with very high capacity merely have an isolating function, so that the bias voltages of the upper gates of the thyratrons are not falsified. Their upper sources So are connected to the lower drains.

Figure 3:
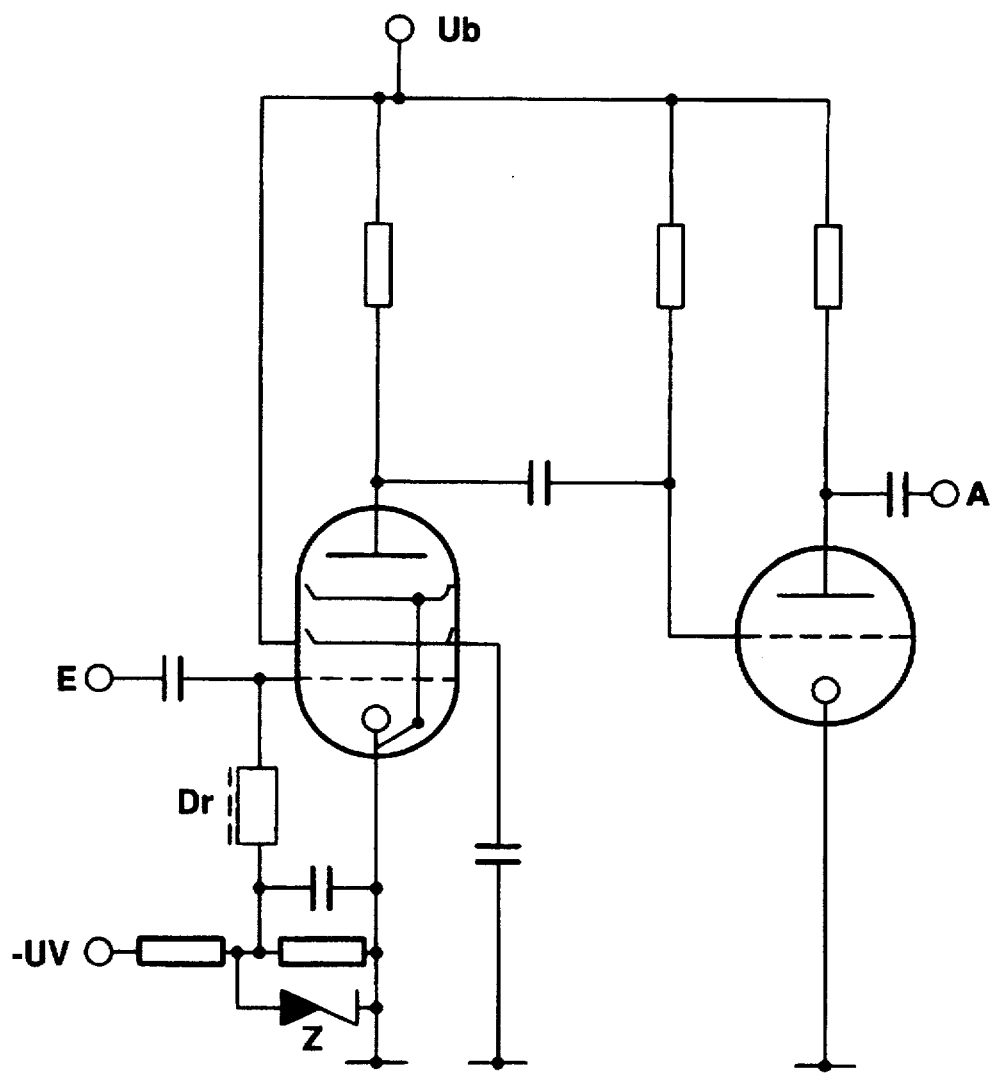
FIG. 3 is a circuit diagram of the pulse shaper and differentiating amplifier.

FIG. 3 shows a circuit diagram of the pulse shaper and differentiating amplifier.

The Goniometrically Scanned Four-Cycle Omnidirectional Antenna on a Vehicle Trailer Motor vehicle engines often cause vibrations to the body and antennas, which cause jitter on the screen and are difficult to remove. It is therefore advantageous for the transmitting and receiving antennas to be located on a small trailer. The latter is preferably of the single-axle type, has a square base surface and is made largely from plastics, as are the wheels and rims. Balloon tires containing no wire are preferable. In place of the other conventional metal suspension, the axles may be mounted entirely in rubber, so as to exclude an inductive short-circuit ring action. For the same reason the drawbar should be constituted by a single tube. The lower edge of the trailer box should have roughly the same distance from the ground as the towing vehicle. Its number plate should be made from plastic.

Figure 5:
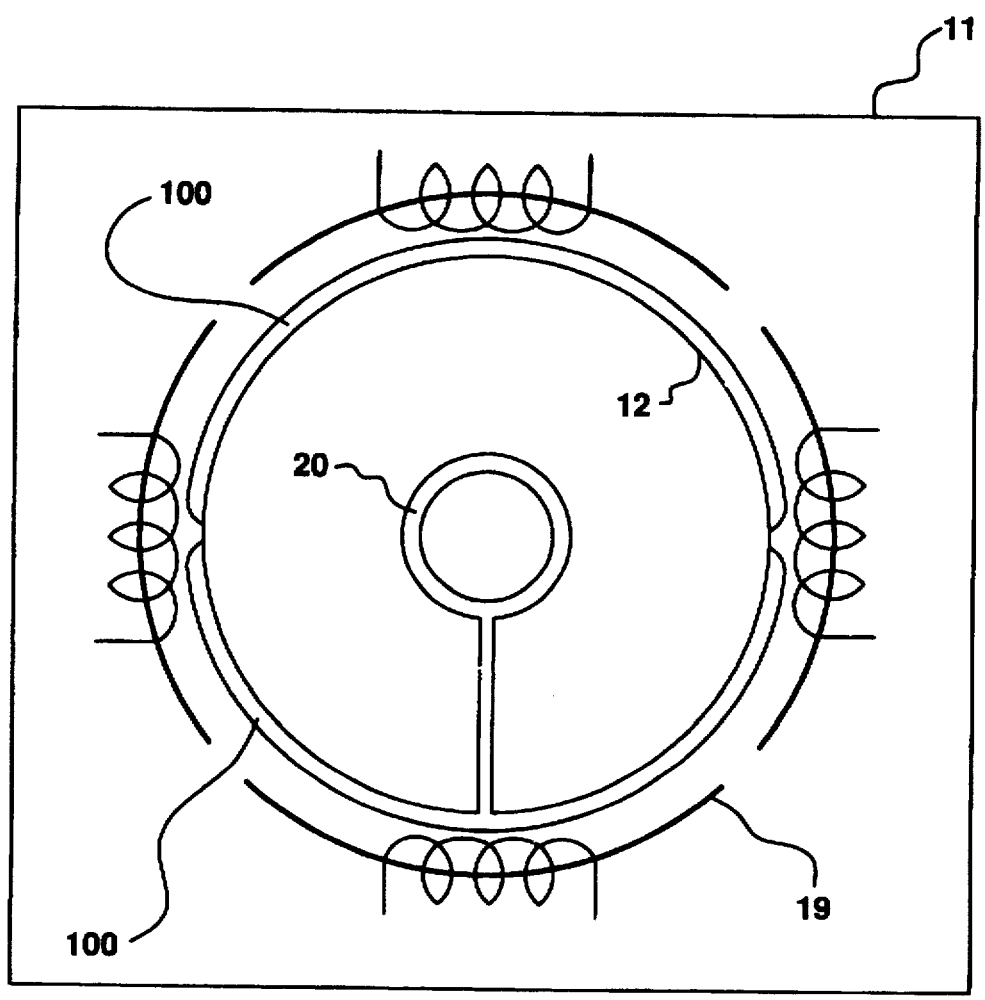
FIG. 5 is a front view of the four-cycle omnidirectional antenna with four quarter-ring-like ferrite rods on a cylindrical shielding or screening box in a vehicle trailer.

Referring now to FIG. 5, in square goniometric radar methods, the four transmitting antennas are horizontally fitted spaced parallel from the four walls on the inside at a half the height. This takes place by means of plastics wedges on the internal, slotted sheet metal box 12 for internal screening so as to prevent back radiation. This internal sheet metal box 12 also has a square base surface, which is smaller than the plastics box to the extent that the transmitting ferrite antennas have about 5 to 10 cm free space around them.

The antennae are roughly 10 to 20 cm shorter than the side walls of the inner sheet metal box in order to prevent back radiation, ie they are projected over. If flat ferrite rods are used, they are so fitted that their main radiation direction is inclined by 45° in the substratum. All the transmitting antennae are also provided with screening plates in cylinder segment form, whose slots have an opening angle of max 60° and their length and width fill the spaces between the plastic box 11 and the sheet metal box 12, centrally surround in spaced manner the ferrite rods and allow a radiation angle between vertical and max 60° inclined into the substratum. In the corners the screen is slotted in order to avoid inductive short-circuits. The radiation angle concentration to 60° all round has the advantage that there is no longer any radiation on the towing vehicle body, chassis and wheels. The radiation direction in the soil is bent at the surface thereof, which is repeated in underground layer boundaries due to the different dielectric constants. Above-ground structures are virtually of no interest.

In the centre of the bottom of the sheet metal and plastic boxes is drilled a hole, into which precisely fits the screen receiving antenna 20, where it is flexibly mounted and fixed to all sides.

For the aforementioned reasons, a through slot extends from the centre of the hole in the sheet metal box to the opposite sheet metal wall on the back, which continues in the screening cylinder. At its upper end the receiving antenna has a support for the fine setting of the right-angled radiation decoupling with respect to the four transmitting antennas. The position of the wheel axle is displaced somewhat outside the centre so as not to collide with the receiving antenna. The complete plastic box is covered with a lockable plastic lid, which is provided at the top and in the centre with a round hole with a protective collar. The size of the hole must give adequate freedom of movement for the receiving antenna, which also has a broad and narrow-band switching relay. FIG. 5 shows an embodiment of the present invention wherein metallic deflectors 100 are fitted between ferrite elements of the transmission means 19 and the outer surfaces of a screening assembly.

Figure 4:
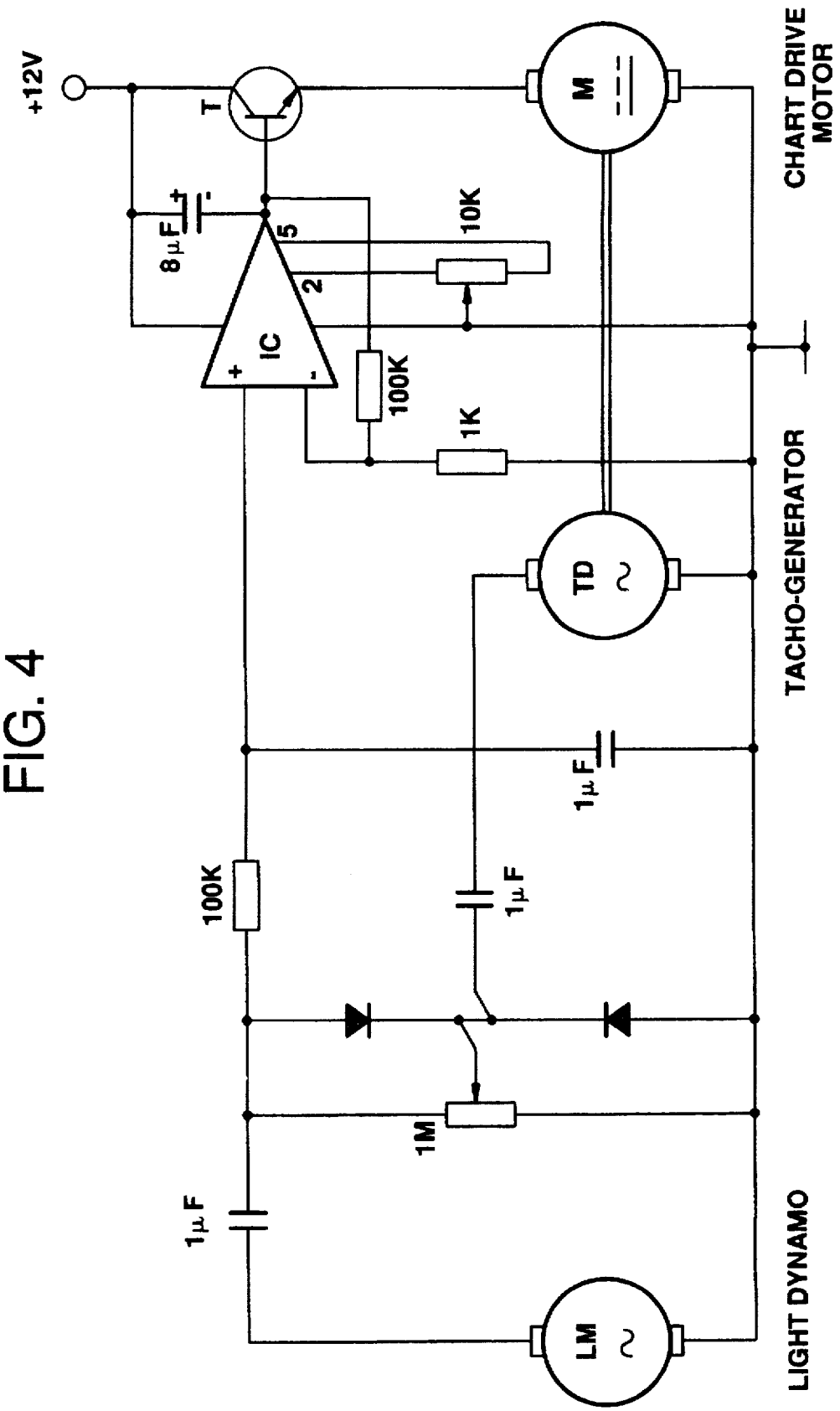
FIG. 4 is a circuit diagram of the synchroniser.

If a synchronisation of the speed of the chart recorder or tape recorder with the car travel speed is desired, it is recommended that use be made of an external synchroniser with a circuit according to FIG. 4. The recorder should contain an alternating current tacho-generator with charging rectifier, whose frequencies are compared in a phase discriminator, which, by means of a variable gain amplifier, keeps in proportion the recorder operating speed and the car travel speed.

The Goniometrically Scanned Four-Cycle Omnidirectional Antenna with Four Quarter-Ring-like Ferrite Rods and Cylindrical Shielding Box on a Vehicle Trailer For the case that quarter-ring-shaped ferrite rods are obtainable or assemblable from curved, smaller ferrite rods, a clear improvement possibility with respect to the omnidirectional diagram exists for the aforementioned antenna. This is because the four ferrite units with a small spacing are assembled in an annular radiant body about a slotted, cylindrical screening box. In order to avoid unintentional back radiation, it is important that the antenna coils not being scanned are intermittently electronically short-circuited for this time period and optionally by a circuit layout on the transmitting amplifier outputs. A Darlington circuit is recommended. A specially shaped shielding box above the ring radiant body presses the transmitting radiation between 60° and 90° perpendicularly into the substratum. The above remarks apply with regards to the trailer.

I claim:

1. A geophysical prospecting apparatus for obtaining site plan pictorial representations of inclusions present in substratum soil which reflect electromagnetic signals, said apparatus comprising:

a quartz oscillator means for generating a sawtooth signal;

transmission means for generating and directing triangular electromagnetic pulse signals into the soil, said transmission means including:

a goniometrically scanned four-cycle transmitter connected to said quartz oscillator means which generates a synchronous rotation of triangular pulse signals in response to the sawtooth signal;

a transmitting antenna driven by the transmitter for directing the triangular pulse signals into the soil;

receiver means for receiving the received triangular pulse signals reflected from the soil, said receiver means including:

a receiving antenna with an amplifier connected thereto for capturing and amplifying the received triangular pulse signals; and a pulse shaper adapted to compress the width of the received triangular pulse signals from the amplifier to produce needle pulses therefrom; and a cathode ray tube display device connected to said receiver means and responsive to said sawtooth signal for displaying said needle pulses.

2. The apparatus according to claim 1 wherein the cathode ray tube display device is a color television tube device which includes four frame coils and four crosswise arranged horizontal sweep coils.

3. The apparatus according to claim 1 wherein said transmitter comprises four power amplifiers.

4. The apparatus according to claim 1 wherein the frequency of the frame sweep and line scanning signals is 50 Hz, and wherein said apparatus generates a synchronizing signal in response to the sawtooth signal for stabilizing the frame sweep and line scanning signals.

5. The apparatus according to claim 4 wherein the frequency of said sawtooth signal is 50 kHz, said apparatus further comprising a frequency divider network having a ratio of 1000:1.

6. The apparatus according to claim 1 wherein said transmitting antenna comprises four ferrite elements.

7. The apparatus according to claim 6 wherein said ferrite elements are mounted on the outer surfaces of a screening assembly.

8. The apparatus according to claim 7 wherein said screening assembly is in the form of a box.

9. The apparatus according to claim 7 wherein said screening assembly is in the form of a cylinder.

10. The apparatus according to claim 6 wherein each ferrite element is rod-like.

11. The apparatus according to claim 6 wherein each ferrite element comprises a quarter-ring-shaped ferrite rod.

12. The apparatus according to claim 7 further comprising metallic deflectors fitted between the ferrite elements and the outer surfaces of the screening assembly.

13. The apparatus according to claim 7 wherein the screening assembly and ferrite elements are surrounded by a housing of plastics material.

14. The apparatus according to claim 13 wherein said receiving antenna is arranged centrally in the screening assembly and surrounding housing.

15. The apparatus according to claim 14 wherein apertures are provided in the top and bottom surfaces of the screening assembly and housing, through which the receiving antenna extends.

16. The apparatus according to claim 14 wherein each of the top and bottom surfaces of the screening assembly has a slot directed towards the outside and emanating from a recess in the respective surfaces.

* * * * *